United States Patent [19]

Sanemitsu

[11] Patent Number: 5,708,853

[45] Date of Patent: Jan. 13, 1998

[54] IC CARD HAVING CAMERA, MICROPHONE, AND MODEM FOR USE IN INFORMATION PROCESSORS

[75] Inventor: Yoshikado Sanemitsu, Tokyo, Japan

[73] Assignee: Mitsubishi Denki Kabushiki Kaisha, Tokyo, Japan

[21] Appl. No.: 561,238

[22] Filed: Nov. 21, 1995

[30] Foreign Application Priority Data

Jul. 24, 1995 [JP] Japan .................................. 7-187258

[51] Int. Cl.$^6$ .............................. C06F 13/00; C06F 19/00
[52] U.S. Cl. ........................... 395/893; 348/376; 361/737
[58] Field of Search ............................ 395/892, 893; 361/737, 749; 345/156; 348/373, 376

[56] References Cited

U.S. PATENT DOCUMENTS

| | | | |
|---|---|---|---|
| 5,509,009 | 4/1996 | Laycock et al. | 370/62 |
| 5,628,031 | 5/1997 | Kikinis et al. | 395/893 |
| 5,630,174 | 5/1997 | Stone et al. | 395/883 |

OTHER PUBLICATIONS

Wilson, Ron "PCMCIA video for notebooks proposed", Electronic Engineering Times, May 22, n849 p.4, 1995.
Roth, Cliff "Cardcam PCMCIA video input card", PC Laptop Computers Magazine, Jul. v7 n7 p.43, 1995.

*Primary Examiner*—Dinh C. Dung
*Attorney, Agent, or Firm*—Birch, Stewart, Kolasch & Birch, LLP

[57] ABSTRACT

An IC Card includes an image input device and an acoustic input device. A transmission controller transmits electrical signals received from the image input device or the acoustic input device to a telephone or communication line, or transmits signals received from the communication line through a first connector to a terminal such as a personal computer. A frame supports the image input device, and the acoustic input device, the transmission controller, while a panel fixed to the frame encloses the image input device, the acoustic input device and the transmission controller. Another type of IC card has a frame with a main body and an extension connected thereto. The extension encloses the image input device and the acoustic input device. In a modified IC card, at least one of the image input device and the acoustic input device includes a rotatable connecting member so that the direction of the device can be set in a wide range.

18 Claims, 8 Drawing Sheets

IC CARD HAVING CAMERA, MICROPHONE, AND MODEM FOR USE IN INFORMATION PROCESSORS

BACKGROUND OF THE INVENTION

1. Field of the Invention

The present invention relates to an IC card used for information processors such as personal computers or personal digital assistants.

2. Description of the Prior Art

An IC card is a card including an integrated circuit such as a central processing unit or a memory device, and it is used as a peripheral equipment for information processing apparatuses such as a notebook-sized computer and a personal digital assistant. IC cards including a memory device such as a static random access memory or a flash memory are used as a memory medium. There are also IC cards having various functions such as a facsimile modem.

A notebook-sized computer is a portable personal computer for individual use. It can be used as a terminal for processing information, and its functions are being expanded rapidly. A terminal such as a personal digital assistant of various types for individual use will also be used widely, and it will be expected to be used for various uses such as a video conference through a communication line. Then, there are demands for IC cards and terminals serving various functions.

SUMMARY OF THE INVENTION

An object of the present invention is to provide an IC card having various communication functions.

Another object of the present invention is to provide a terminal for processing information into which an IC card having various communication functions can be inserted.

A type of an IC card comprises an image input device converting an optical signal to an electrical signal and an acoustic input device converting an acoustic signal to an electrical signal. A transmission controller transmits an electrical signal received from the image input device or the acoustic input device through a connector to a telephone or communication line or transmits an electrical signal received from the communication line through a first connector to a terminal such as a personal computer. A frame mounts the image input device, the acoustic input device, the transmission controller, while a panel fixed to the frame encloses the image input device, the acoustic input device and the transmission controller. Further, the panel comprises a first hole for propagating an image to said image input device and a second hole for propagating a sound to said acoustic input device. This type of an IC card is used for a computer having a slot therefor and having holes corresponding to the first and second holes so as not to prevent propagation of an image and a sound when the IC card is inserted into the slot.

Another type of an IC card has a feature that a frame mounting an image input device, an acoustic input device, a transmission controller and first and second connectors comprises a main body and an extension connected thereto. The extension encloses the image input device and the acoustic input device, and it comprises a first hole for propagating an image to the image input device and a second hole for propagating a sound to the acoustic input device. This type of an IC card is used for a conventional computer without providing holes corresponding to the first and second holes. In a modified IC card, at least one of the image input device and the acoustic input device comprises a rotatable connecting member which is connected to the frame. Then, the direction of the image input device or the acoustic input device can be set in a wide range.

An advantage of the present invention is that image and acoustic signals can be dealt only by inserting an IC card into a terminal because an image input device and an acoustic input device is integrated in an IC card.

Another advantage of the present invention is that an image input device and/or an acoustic input device can be set at a desired direction by an operator.

BRIEF DESCRIPTION OF THE DRAWINGS

These and other objects and features of the present invention will become clear from the following description taken in conjunction with the preferred embodiments thereof with reference the accompanying drawings, and in which.

DETAILED DESCRIPTION OF THE PREFERRED EMBODIMENTS

When a video conference is held by using a monitor display and a speaker of a notebook-sized personal computer, personal digital assistants and the like, a video image and a sound of an operator have to be sent through a communication line, while a video image and a sound of other operators have to be displayed on the monitor display and heard with the speaker. In order to send and receive a video image and a sound, an IC card may be proposed to have functions of processing image and sound signals. For this purpose, it is possible to connect a camera unit and a microphone unit to the IC card directly or through cables. This setup has an advantage that the camera unit and the like can be arranged at appropriate positions, but it has a disadvantage that they have to be fixed always with a hand or the like.

Figure 1:
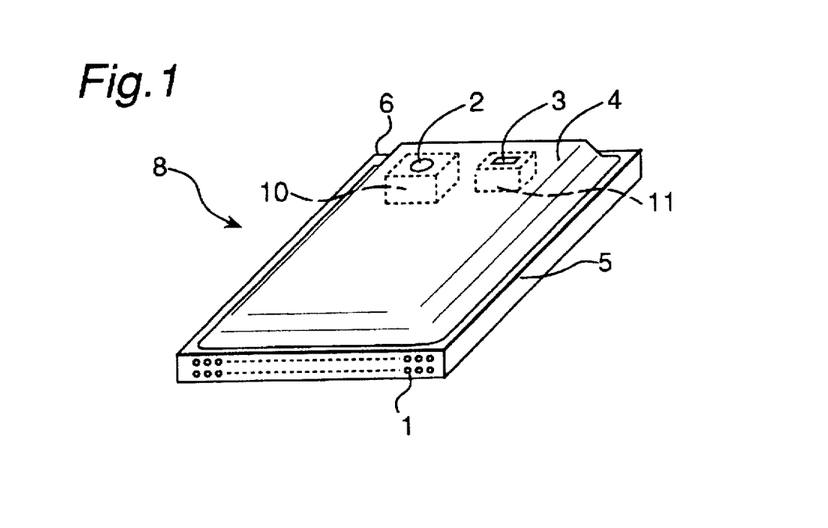
FIG. 1 is a perspective view of an embodiment of an IC card according to the invention.

In the invention, an image input device and an acoustic input device are integrated with an IC card. Referring now to the drawings, wherein like reference characters designate like or corresponding parts throughout the several views, FIG. 1 shows an IC card 8 of an embodiment according to the invention. In the IC card 8, a board (not shown) mounting an electrical circuit is fixed to a frame 5, and the frame is fixed to and protected by upper and lower panels 4 (the lower panel is not shown). The upper panel 4 has a top plane with a convex shape at the peripheral thereof. A connector 1 to be connected to a system (host) such as a personal computer is counted at an end along a longitudinal direction of the IC card 8, in order to make it possible to communicate data with the system. Further, another or rear connector 6 (not shown) to be connected to an ISDN network (telephone line) is counted at the other end along the longitudinal direction of the IC card 8, in order to make it possible to communicate data through the telephone line. As shown in FIG. 1, the upper panel 4 has a hole 2 for receiving an image and a hole 3 for receiving a sound, and a photoelectric converter device 10 such as a charge-coupled device and an acousto-electric converter device 11 such as a microphone are mounted on the board fixed to the frame 5 so as to be arranged just below the holes 2 and 3. A size of the IC card 8 is usually 85.6 mm * 54 mm.

Figure 2:
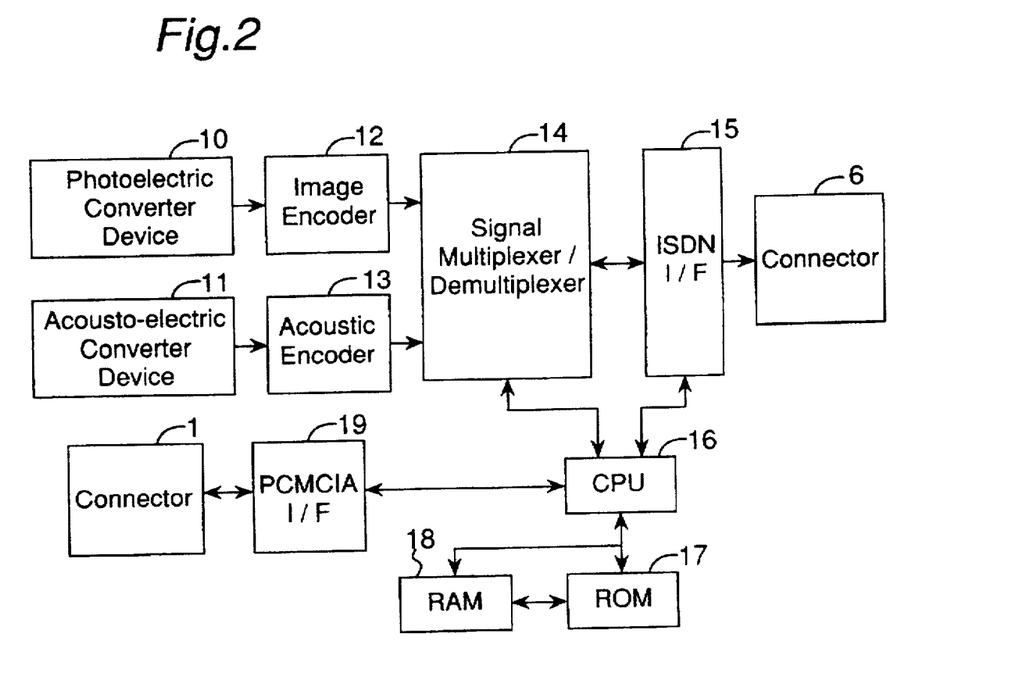
FIG. 2 is a circuit diagram of the IC card shown in FIG. 1.

FIG. 2 is a circuit diagram of the IC card shown in FIG. 1. A central processing unit (CPU) 16 is connected to a ROM 17 storing a program and data and to a RAM 18 used as a data buffer. The CPU 16 communicates data with a telephone line or an external system (not shown) through a PCMCIA (Personal Computer Memory Card International Association) interface 19 and the connector 6. On the other hand, an image (optical signal) received by the photoelectric converter device 10 through the hole 2 is converted to an electrical signal, and the signal is coded in real time by an image encoder 12 to image data to be input to a signal multiplexer/demultiplexer 14. At the same time, a sound (acoustic signal) received by the acousto-electric converter device 11 is converted to an electrical signal, and the signal is coded in real time by an acoustic encoder 13 to sound data to be input to the signal multiplexer/demultiplexer 14. The signal multiplexer/demultiplexer 14 allocates one slot alternately to image and acoustic input data for multiplication, for example, according to H320 standards of International telecommunication Union (ITU), and an ISDN (Integrated Services Digital Network) interface 15 sends the multiplex signals through the rear connector 6 to the ISDN network (telephone line). On the other hand, the signal multiplexer/demultiplexer 14 receives signals through the ISDN network, the connector 6 and the ISDN interface 15 and separates them to image signals and acoustic signals. The CPU 16 receives the separated signals and sends them to the system, which generates an image and a sound according to the signals. (A similar electrical circuit is mounted on boards in embodiments to be explained below, but the explanation of the circuit is omitted for concise explanation).

Figure 3:
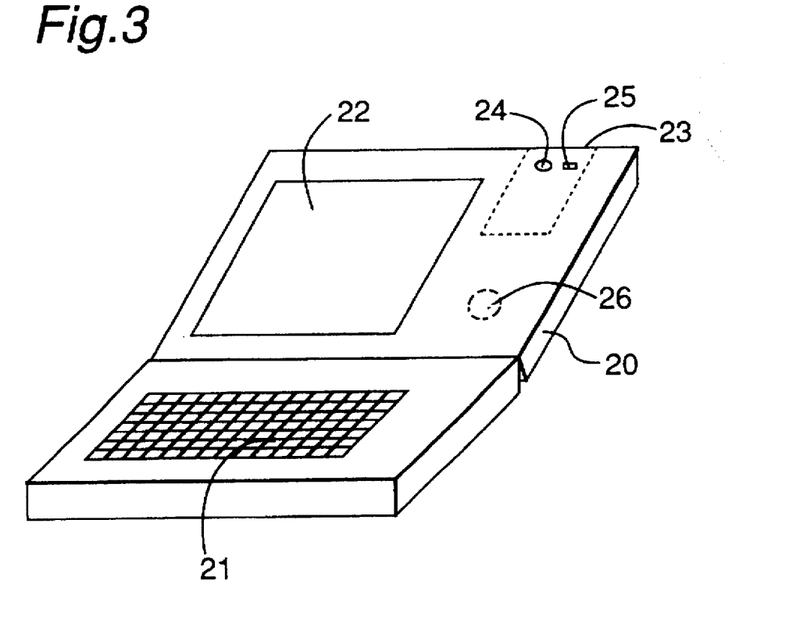
FIG. 3 is a perspective view of a notebook-sized computer into which an IC card shown in FIG. 1 can be inserted.

FIG. 3 shows a notebook-sized computer having a slot 23 for inserting the IC card 8 shown in FIGS. 1 and 2. The computer consists of a base having a keyboard 21 and a top 20 having a display 22 and a speaker 26. The top 20 connected to the base is moved relatively to the base. The slot 23 is provided near the display 22 so that an IC card can be inserted from above. Holes 24 and 25 for receiving an image and a sound are provided at positions in correspondence to the holes 2 and 3 of the IC card when the IC card is inserted into the slot 23. The holes 24 and 25 are empty for propagating an image and a sound. However, a window made of a transparent material may be provided at the hole 24 for receiving an image.

Figure 4:
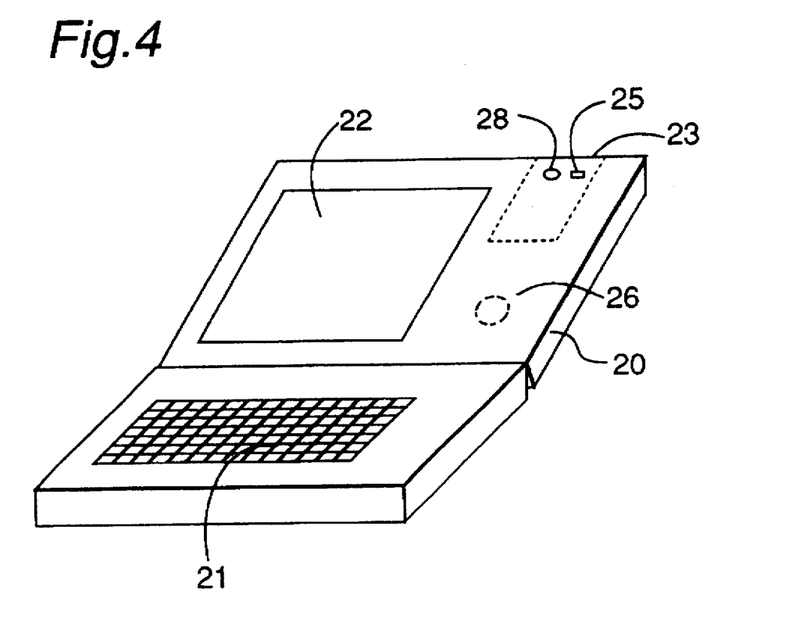
FIG. 4 is a perspective view of a modified example of the notebook-sized computer shown in FIG. 3.

FIG. 4 shows a modified example of a notebook-sized computer, wherein a lens 28 as a component of the photoelectric converter device 10 may be mounted at the hole 24.

An IC card 8 is inserted into the personal computer shown in FIG. 3 or 4, for example, on video conference. Signals (information) are received from the other party through the rear connector 6, and an image included in the signals is displayed on the display 22 and a sound included in the signals is generated at the speaker 26.

As explained above, an image input device and a sound input device are integrated in the IC card 8 shown in FIGS. 1 and 2. Then, an image and a sound can be input only by inserting the IC card 8 into a terminal such as a personal computer shown in FIG. 3 or 4.

Figure 5:
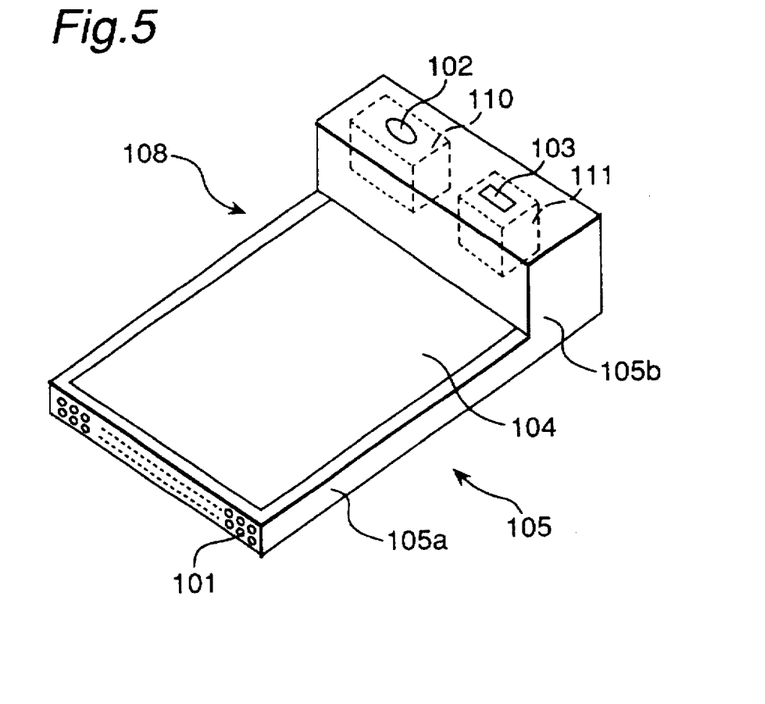
FIG. 5 is a perspective view of a second embodiment of an IC card according to the invention.

FIG. 5 shows an IC card 108 of a second embodiment according to the invention. The IC card 108 includes a board (not shown) mounting an electrical circuit and fixed to a frame 105, and the frame 105 is fixed to and protected by upper and lower two panels 104. A connector 101 to be connected to a system (host) such as a personal computer is mounted at an end along a longitudinal direction of the IC card 108, in order to make it possible to communicate data with the system. Further, another or rear connector 106 (not shown) to be connected to an ISDN network (telephone line) is mounted at the other end along the longitudinal direction of the IC card 108, in order to make it possible to communicate data through the telephone line. A width of the IC card 108 is 54 mm similar to that of the IC card shown in FIG. 1, but the length thereof is larger than 85.6 mm. The upper panel 104 is flat in contrast to the counterpart 4 of the IC card shown in FIG. 1. Further, the frame 105 comprises a main body 105a and an extension 105b connected to an end of the main body 105a at the rear side. The extension 105b is a feature of the IC card 108. The bottom of the extension 105b extends straightly from the main body 105a of the IC card, while the top thereof protrudes upward. A top plane of the extension 105b has a hole 102 for receiving an image and a hole 103 for receiving a sound, and a photoelectric converter device 110 such as a charge-coupled device and an acousto-electric converter device 111 such as a microphone are mounted on the board fixed to the frame 105 to be arranged just below the holes 102 and 103. The direction of the top plane of the extension 105b is set so that an image and a sound of an operator of the computer are easy to be detected when the IC card 108 is inserted. In the example shown in FIG. 5, the top plane of the extension 105b is generally parallel to the top plane of the panel 104.

Figure 6:
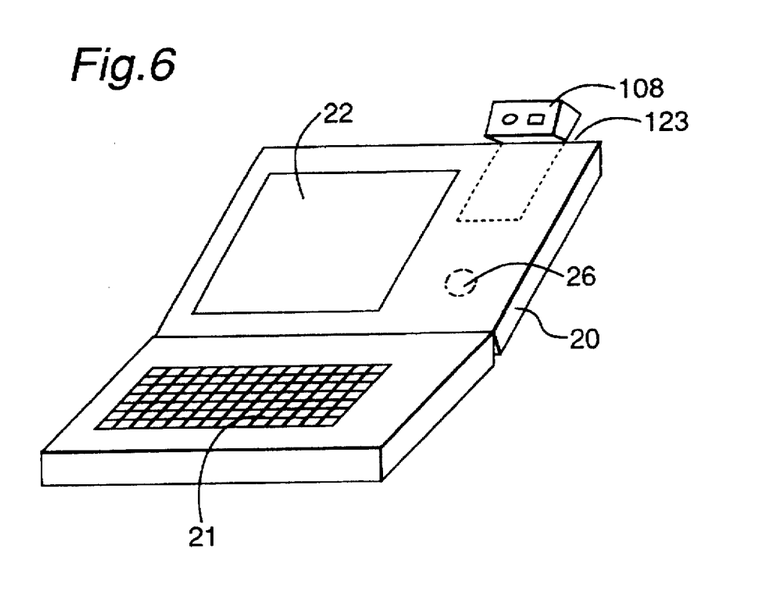
FIG. 6 is a perspective view of a notebook-sized computer into which an IC card shown in FIG. 5 can be inserted.

FIG. 6 shows a notebook-sized computer into which the IC card shown in FIG. 5 is inserted. The computer is similar to that shown in FIG. 3 except that no holes for receiving an image and a sound are provided in the top 20 because the IC card 108 having the extension 105b is inserted into a slot 123 from above. As explained above, the extension 105b includes the holes 102, 103 for receiving an image and a sound, and the photoelectric converter device 110 and the acousto-electric converter device 111 both arranged just below the holes 102 and 103. In other words, an ordinary notebooksized computer can be used for the IC card 108.

Figure 7:
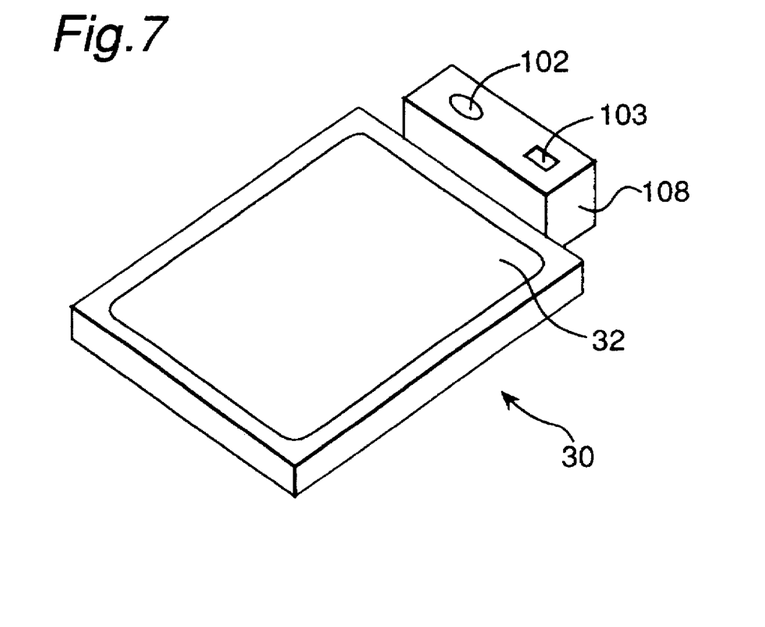
FIG. 7 is a perspective view of a personal digital assistant into which an IC card shown in FIG. 5 can be inserted.

FIG. 7 shows a personal digital assistant (PDA) into which the IC card 108 shown in FIG. 5 is inserted. The PDA comprises a display 32, and the IC card 108 is inserted into a slot (not shown) provided at a top end of the PDA. The IC card 108 is located just below the display 32. Therefore, an image and a sound of an operator who operates the PDA by using a picture plane of the display can be introduced eventually through the holes 102 and 103, and they are converted to electrical information by using the photoelectric converter device 110 and the acousto-electric device 111.

Figure 8:
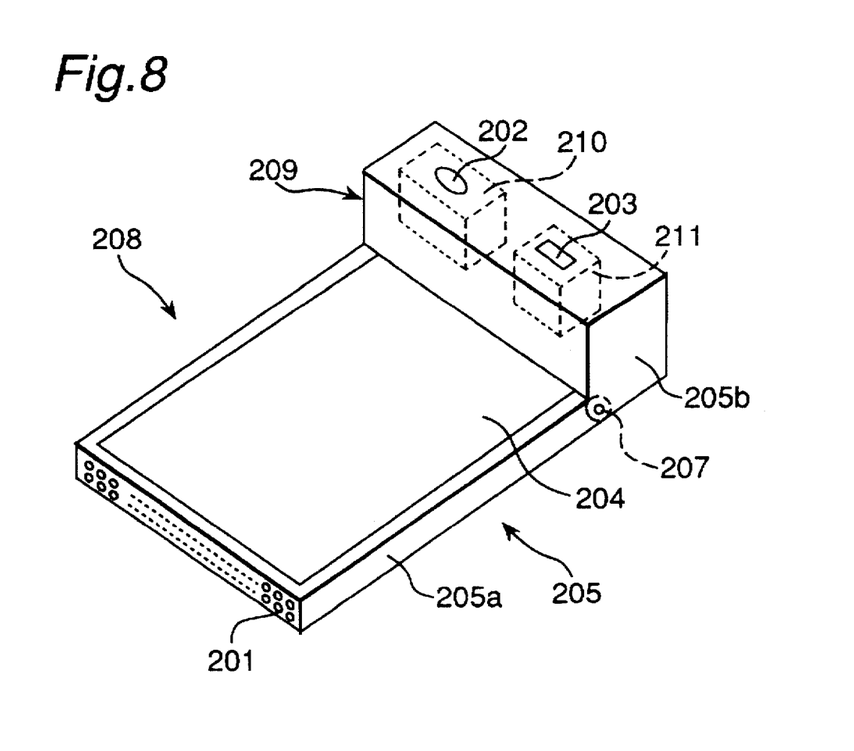
FIG. 8 is a perspective view of a third embodiment of an IC card according to the invention.

FIG. 8 shows an IC card of a third embodiment according to the invention. The IC card comprises a main body 208 and an extension 209, and the extension 209 is connected with a hinge 207 to the main body 208. Thus, the extension 209 pivots against the main body 208. This IC card 208 is similar to that shown in FIG. 5 except the hinge 207 and relevant modifications. The main body 208 includes a board (not shown) mounting an electrical circuit and fixed to a frame 205, and the frame 205 is fixed to and protected by upper and lower panels 204 (the lower panel is not shown). A connector 201 to be connected to a system (host) such as a personal computer is mounted at an end of the frame 205 opposite to the hinge 207. Another rear connector 206 (not shown) to be connected to an ISDN network (telephone line) is mounted in the extension 209 at an end opposite to the hinge 207. The bottom of the extension 209 extends continuously from the main body of the IC card, while the top thereof protrudes upward. A top plane of the extension 209 has a hole 202 for receiving an image and a hole 203 for receiving a sound, while a photoelectric converter device 210 such as a charge-coupled device and an acousto-electric converter device 211 such as a microphone are arranged just below the holes 202 and 203.

In the IC card 208, the extension 209 is connected with a hinge 207 to the main body 208. Therefore, the direction of the extension 209 can be changed back and forth along the longitudinal direction of the IC card. Then, if the IC card is inserted into the personal computer as shown in FIG. 3, an image other than the operator can be transmitted by changing the direction of the extension 209 back and forth. Further, if the IC card is inserted into the personal digital assistant 30 as shown in FIG. 7, an image other than the operator can also be transmitted by changing the direction of the holes 102 and 103.

Figure 9:
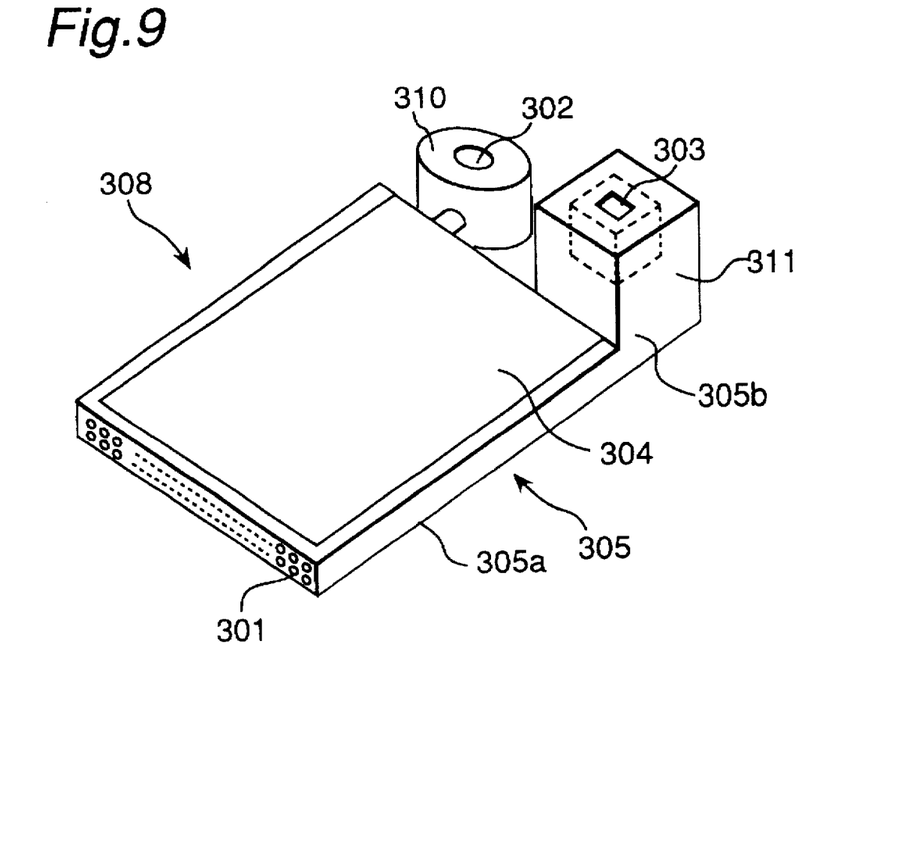
FIG. 9 is a perspective view of a fourth embodiment of an IC card according to the invention.

FIG. 9 shows an IC card 308 of a fourth embodiment according to the invention wherein the direction of a photoelectric converter device 310 can be changed freely. The IC card 308 includes a board (not shown) mounting an electrical circuit and fixed to a frame 305, and the frame 305 is fixed to and protected by upper and lower panels 304 (the lower panel is not shown). A connector 301 to be connected to a system (host) such as a personal computer is mounted at an end along a longitudinal direction of the IC card 308. Further, another connector 306 (not shown) to be connected to an ISDN network (telephone line) is mounted at the other end along the longitudinal direction of the IC card 308. The frame 305 comprises a main body 305a and an extension 305b connected to the main body 305a at an end thereof along the longitudinal direction. The extension 305b exists only at the right side. The bottom of the extension 305b extends straightly from the main body of the IC card, while the top thereof protrudes upward. A top plane of the extension 305b has a hole 303 for receiving a sound, and an acousto-electric converter device 311 such as a microphone is mounted so as to be arranged just below the hole 303. It is a feature of this embodiment that the photoelectric converter device 310 such as a charge-coupled device is connected to the main body 305a of the frame 305 with a spherical joint 309 (refer to FIG. 10) and it has a hole 302 for receiving an image at a front side thereof.

Figure 10:
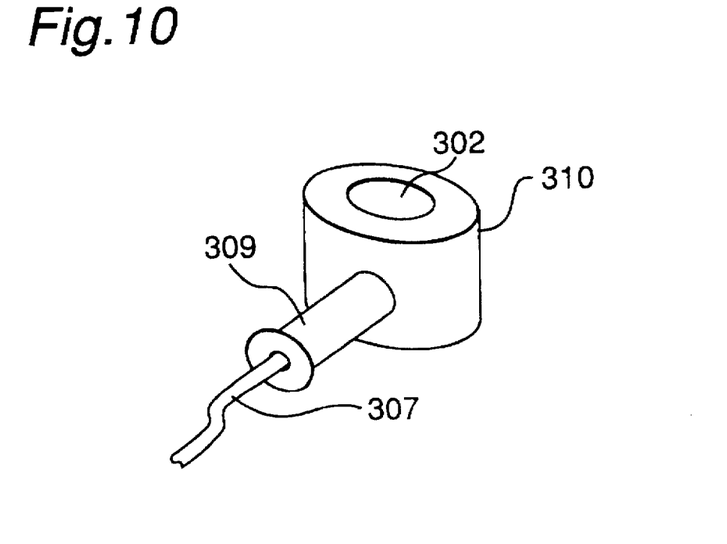
FIG. 10 is a perspective view of a photoelectric converter device.
Figure 11:
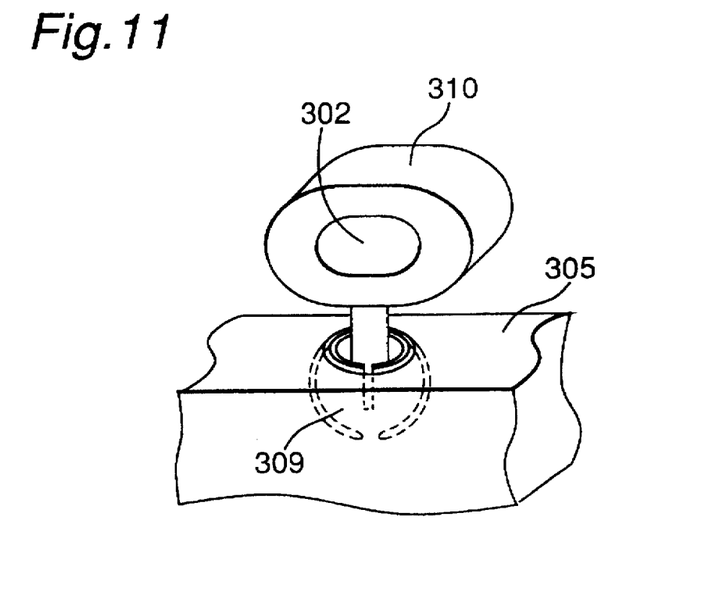
FIG. 11 is a perspective view of the photoelectric converter device connected to a frame.

FIG. 10 shows the photoelectric converter device 310 having the spherical joint 309 having a spherical part at an end thereof. The device 310 is connected with the spherical joint 309 to the frame 305 of the IC card mechanically and with a cable 307 to the IC card electrically. FIG. 11 shows a situation of the photoelectric converter device 310 connected to the frame 305. The direction of the hole 302 of the photoelectric converter device 305b can be changed by rotating the device 310 with the spherical joint 309.

Figure 12:
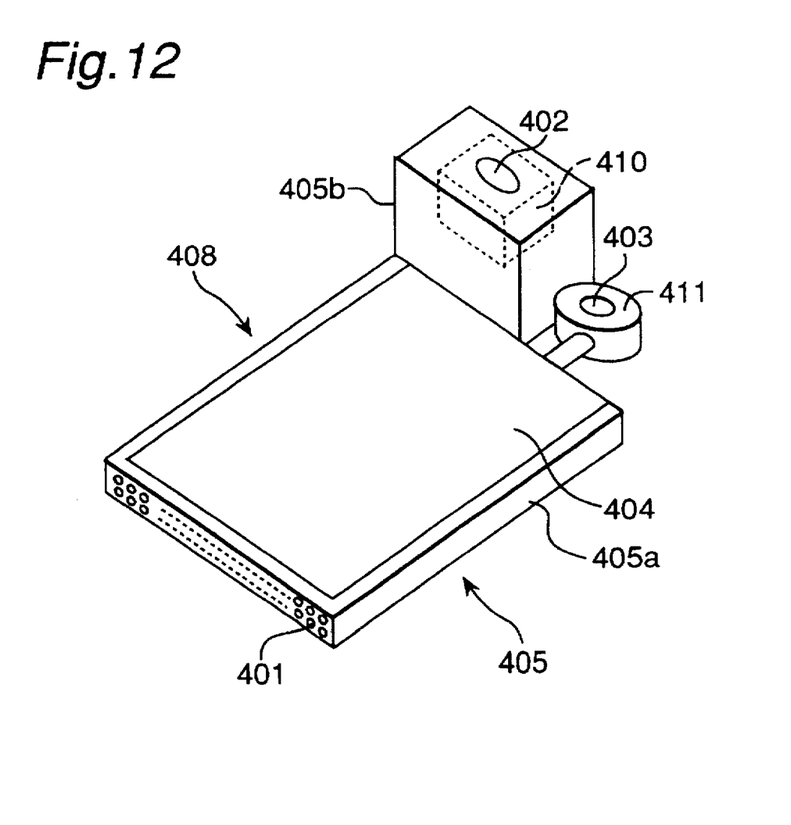
FIG. 12 is a perspective view of a fifth embodiment of an IC card according to the invention.

FIG. 12 shows an IC card 408 of a fifth embodiment according to the invention, wherein the direction of an acousto-electric converter device 411 can be changed freely. A structure of the acousto-electric converter device 410 for connection to a frame 405 of the IC card 408 is similar to that of the photoelectric converter device 410 shown in FIGS. 9–11. The IC card 408 includes a board (not shown) mounting an electrical circuit and fixed to the frame 405, and the frame 405 is fixed to and protected by upper and lower panels 404 (the lower panel is not shown). A connector 401 to be connected to a system (host) such as a personal computer is mounted at an end along a longitudinal direction of the IC card 408. Further, another connector 406 (not shown) to be connected to an ISDN network (telephone line) is mounted at the other end along the longitudinal direction of the IC card 408. The frame 405 comprises a main body 405a and an extension 405b connected to the main body 405a at an end thereof along the longitudinal direction. The extension 405b exists only at the left side. The bottom of the extension 405b extends straightly from the main body of the IC card, while the top thereof protrudes upward. A top plane of the extension 405b has a hole 402 for receiving an image, and a photoelectric converter device 410 such as a charge-coupled device is arranged just below the hole 402. It is a feature of this embodiment that the acousto-electric converter device 411 such as a microphone is connected to the main body 405a with a spherical joint (not shown), and a hole 403 for receiving a sound is provided at a front side thereof.

Figure 13:
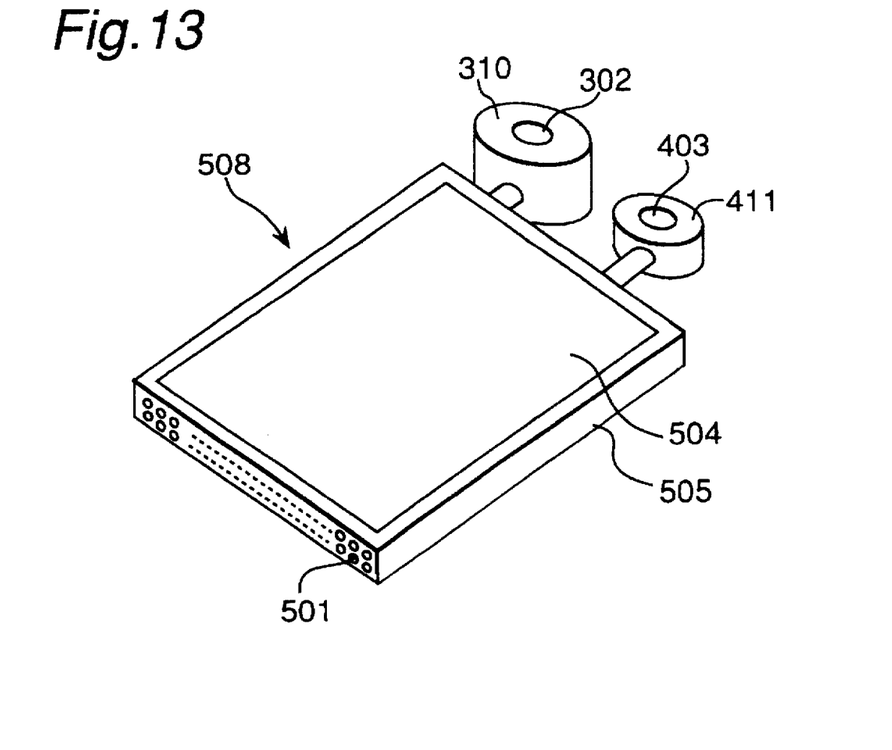
FIG. 13 is a perspective view of a modified embodiment of the fifth embodiment of an IC card according to the invention.

FIG. 13 shows an IC card 508 of a modified embodiment of the fifth embodiment, wherein the directions of a photoelectric converter 310 and an acousto-electric converter device 411 can be changed freely with spherical joints (not shown). Structures of the photoelectric converter device 310 and the acousto-electric converter device 411 for connection to a frame 405 of the IC card 508 are the same as the counterparts of the photoelectric converter device 310 shown in FIGS. 9–11 and the acousto-electric converter device 411 shown in FIG. 12. The IC card 508 includes a board (not shown) mounting an electrical circuit and fixed to the frame 505, and the frame 505 is fixed to and protected by upper and lower panels 504 (the lower panel is not shown). A connector 501 to be connected to a system (host) such as a personal computer is mounted at an end along a longitudinal direction of the IC card 508. Further, another connector 506 (not shown) to be connected to an ISDN network (telephone line) is mounted at the other end along the longitudinal direction of the IC card 508.

As explained above, in the IC cards shown in FIGS. 9–14, the direction of the devices for receiving a sound and/or an image can be changed as desired by an operator.

Figure 14:
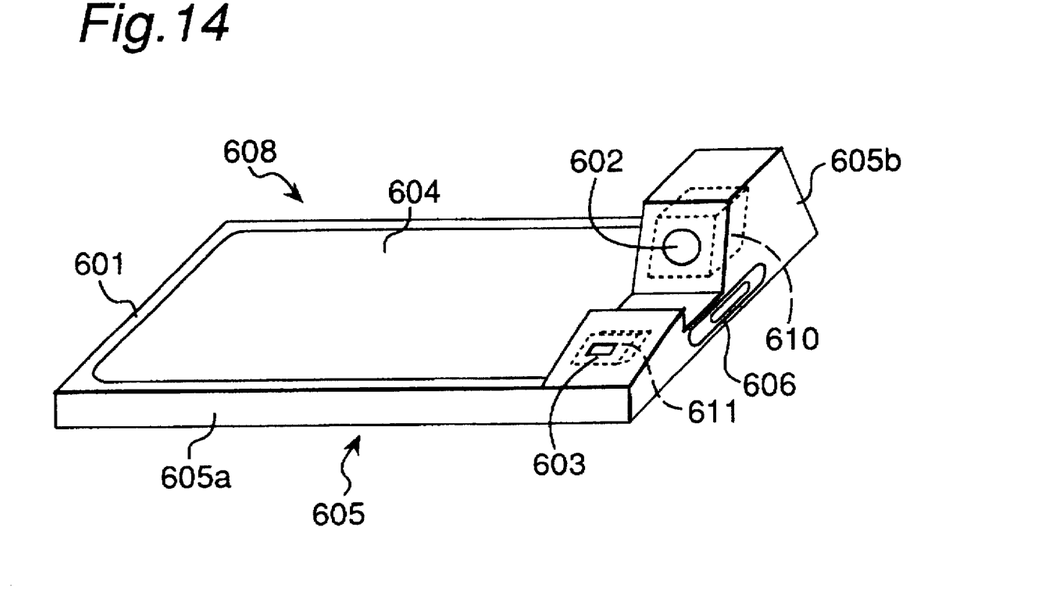
FIG. 14 is a perspective view of a sixth embodiment of an IC card according to the invention.

FIG. 14 shows an IC card 608 of a sixth embodiment according to the invention. The IC card 608 arranges a photoelectric converter device 610 and an acousto-electric converter device 611 at a shorter side thereof similarly to that shown in FIG. 5, but with different directions thereof. The IC card 608 includes a board (not shown) mounting an electrical circuit and fixed to a frame 605, and the frame 605 is fixed and protected by upper and lower panels 604 (the lower panel is not shown). A connector 601 (not shown) to be connected to a system (host) such as a personal computer is mounted at an end along a longitudinal direction of the IC card 608. Further, another connector 606 to be connected to an ISDN network (telephone line) is mounted at the other end along the longitudinal direction of the IC card 608. Further, the frame 605 comprises a main body 605a and an extension 605b connected to the main body 605a at a shorter side of the IC card. The bottom of the extension 605b extends straightly from the main body 605a of the IC card, while the top thereof protrudes upward. A top plane of the extension 605b has a hole 602 for receiving an image and a hole 603 for receiving a sound, and the photoelectric converter device 610 such as a charge-coupled device and the acousto-electric converter device 611 such as a microphone are mounted on the board fixed to the frame 605 to be arranged just below the holes 602 and 603. The direction of planes having the holes 602 and 603 are slant with respect to the top panel 604 so that the holes 602 and 603 for receiving an image and a sound of an operator can face the operator when the IC card 608 is inserted.

Figure 15:
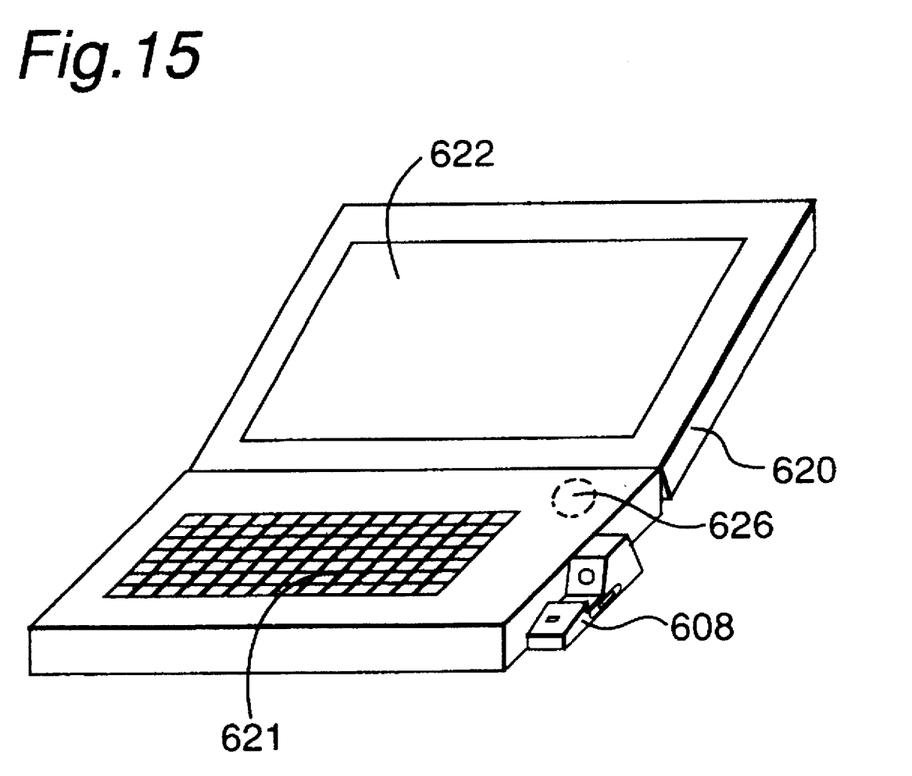
FIG. 15 is a perspective view of a notebook-sized personal computer having a slot for inserting the IC card shown in FIG. 14.

FIG. 15 shows a notebook-sized personal computer. The computer consists of a base having a keyboard 621 and a speaker 626, and a top 620 having a display 622. The top 620 connected to the base is movable relatively to the base. The computer has a slot (not shown) for inserting an IC card 608 shown in FIG. 14. The slot is provided beside the display 622, and it is hidden in FIG. 15 by the IC card 608 inserted into the slot. By adjusting an angle of the IC card 608 or the holes 602 and 603 for receiving an image and a sound, an image and a sound of an operator can be transmitted surely.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An IC card comprising:

a first connector connectable to a terminal for processing information;

a second connector connectable to a communication line;

an image input device converting an optical signal to an electrical signal;

an acoustic input device converting an acoustic signal to an electrical signal;

a transmission controller transmitting an electrical signal received from said image input device or said acoustic input device through said second connector to the communication line and transmitting an electrical signal received from the communication line through said first connector to the terminal;

a frame mounting said image input device, said acoustic input device, said transmission controller and said first and second connectors;

a panel connected to said frame, said panel enclosing said first connector, said second connector, said image input device, said acoustic input device and said transmission controller;

wherein said panel comprises a first hole for propagating an image to said image input device and a second hole for propagating a sound to said acoustic input device.

2. The IC card according to claim 1, wherein said transmission controller comprises a signal multiplexer which generates multiplex signals of the electrical signals received from said image input device and from said acoustic input device and transmits the multiplex signals through said second connector to the communication line.

3. The IC card according to claim 1, wherein said transmission controller comprises a signal demultiplexer which separates image signals and acoustic signals from multiplex signals received through said second connector and sends the image and acoustic signals through said first connector to the terminal.

4. An IC card comprising:

a first connector connectable to a terminal for processing information;

a second connector connectable to a communication line;

an image input device converting an optical signal to an electrical signal;

an acoustic input device converting an acoustic signal to an electrical signal;

a transmission controller transmitting an electrical signal received from said image input device or said acoustic input device through said second connector to the communication line and transmitting an electrical signal received from the communication line through said first connector to the terminal;

a frame mounting said image input device, said acoustic input device, said transmission controller and said first and second connectors, said frame comprising a main body and an extension connected thereto, said extension enclosing said image input device and said acoustic input device and mounting said second connector at an end thereof, said extension comprising a first hole for propagating an image to said image input device and a second hole for propagating a sound to said acoustic input device; and a panel connected to said frame, said panel enclosing said transmission controller.

5. The IC card according to claim 4, wherein said extension has a surface at which said first and second holes are provided, and the surface is parallel to an upper surface of said panel along a direction perpendicular to the longitudinal direction of said frame.

6. The IC card according to claim 4, wherein said extension has a first surface at which said first hole is provided and a second surface at which said second hole is provided, and the surfaces are slant with respect to an upper surface of said panel along a direction perpendicular to the longitudinal direction of said frame.

7. The IC card according to claim 4, wherein said frame comprises a main body and said extension, said frame further comprising a hinge connecting said main body to said extension.

8. The IC card according to claim 4, wherein said transmission controller comprises a signal multiplexer which generates multiplex signals of the electrical signals received from said image input device and from said acoustic input device and transmits the multiplex signals through said second connector to the communication line.

9. The IC card according to claim 4, wherein said transmission controller comprises a signal demultiplexer which separates image signals and acoustic signals from multiplex signals received through said second connector and sends the image and acoustic signals through said first connector to the terminal.

10. An IC card comprising:

a first connector connectable to a terminal for processing information;

a second connector connectable to a communication line;

an image input device converting an optical signal to an electrical signal, said image input device comprising a first hole for propagating an image;

an acoustic input device converting an acoustic signal to an electrical signal, said acoustic input device comprising a second hole for propagating a sound;

a transmission controller transmitting an electrical signal received from said image input device or said acoustic input device through said second connector to the communication line and transmitting an electrical signal received from the communication line through said first connector to the terminal;

a frame mounting said image input device, said acoustic input device, said transmission controller and said first and second connectors; and a panel connected to said frame, said panel enclosing said transmission controller and said first and second connectors;

wherein one of said image input device and said acoustic input device comprising a rotatable connecting member which is connected to said frame.

11. The IC card according to claim 10, wherein said connecting member comprises a spherical joint.

12. The IC card according to claim 10, wherein said image input device comprises said connecting member.

13. The IC card according to claim 10, wherein said acoustic input device comprises said connecting member.

14. The IC card according to claim 12, wherein said acoustic input device comprises said connecting member.

15. The IC card according to claim 10, wherein said transmission controller comprises a signal multiplexer which generates multiplex signals of the electrical signals received from said image input device and from said acoustic input device and transmits the multiplex signals through said second connector to the communication line.

16. The IC card according to claim 10, wherein said transmission controller comprises a signal demultiplexer which separates image signals and acoustic signals from multiplex signals received through said second connector and sends the image and acoustic signals through said first connector to the terminal.

17. A terminal for processing information comprising a casing and an electrical circuit enclosed by the casing, the casing comprising:

a slot for inserting an IC card enclosing an image input device converting an optical signal to an electrical signal, said image input device comprising a first hole for propagating an image, an acoustic input device converting an acoustic signal to an electrical signal, said acoustic input device comprising a second hole for propagating a sound, the IC card transmitting the electrical signals received from the image input device and said acoustic input device to the terminal; and third and fourth holes provided at positions in correspondence to the first and second holes when the IC card is inserted into said slot.

18. The terminal according to claim 17, wherein said image input device comprises a lens, and the lens is mounted to said third hole.

* * * * *